United States Patent Office 3,279,100
Patented Oct. 18, 1966

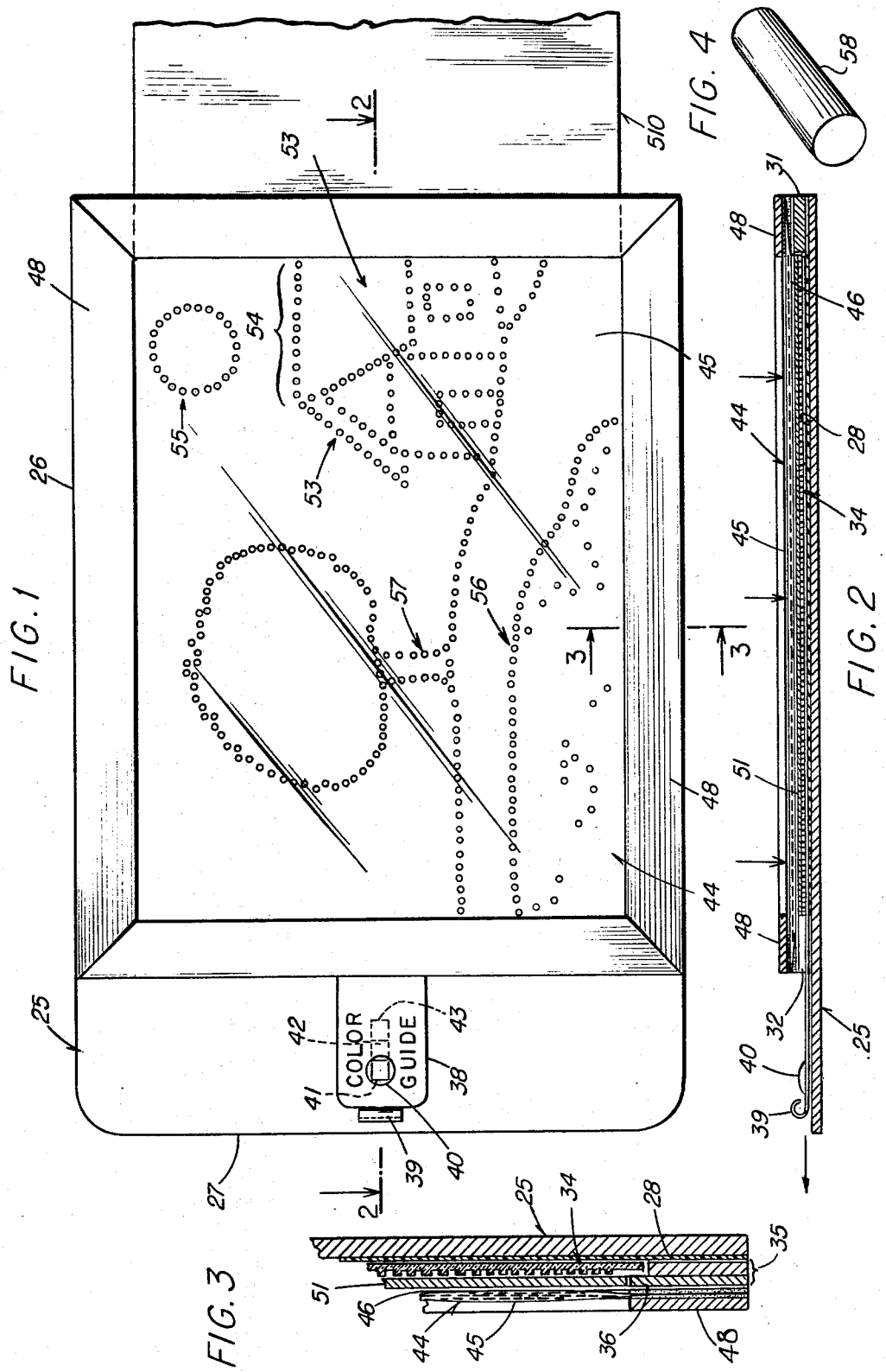

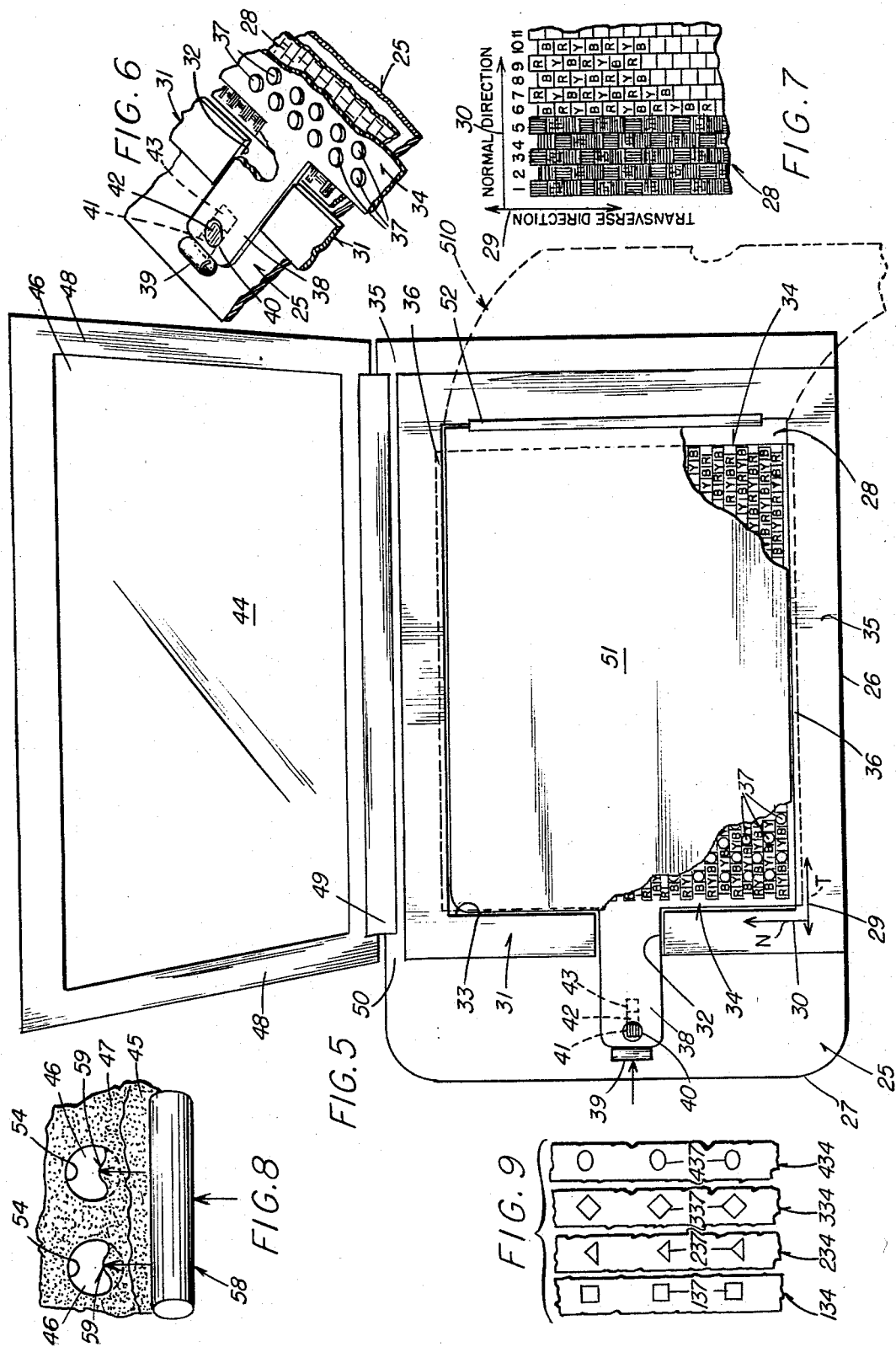

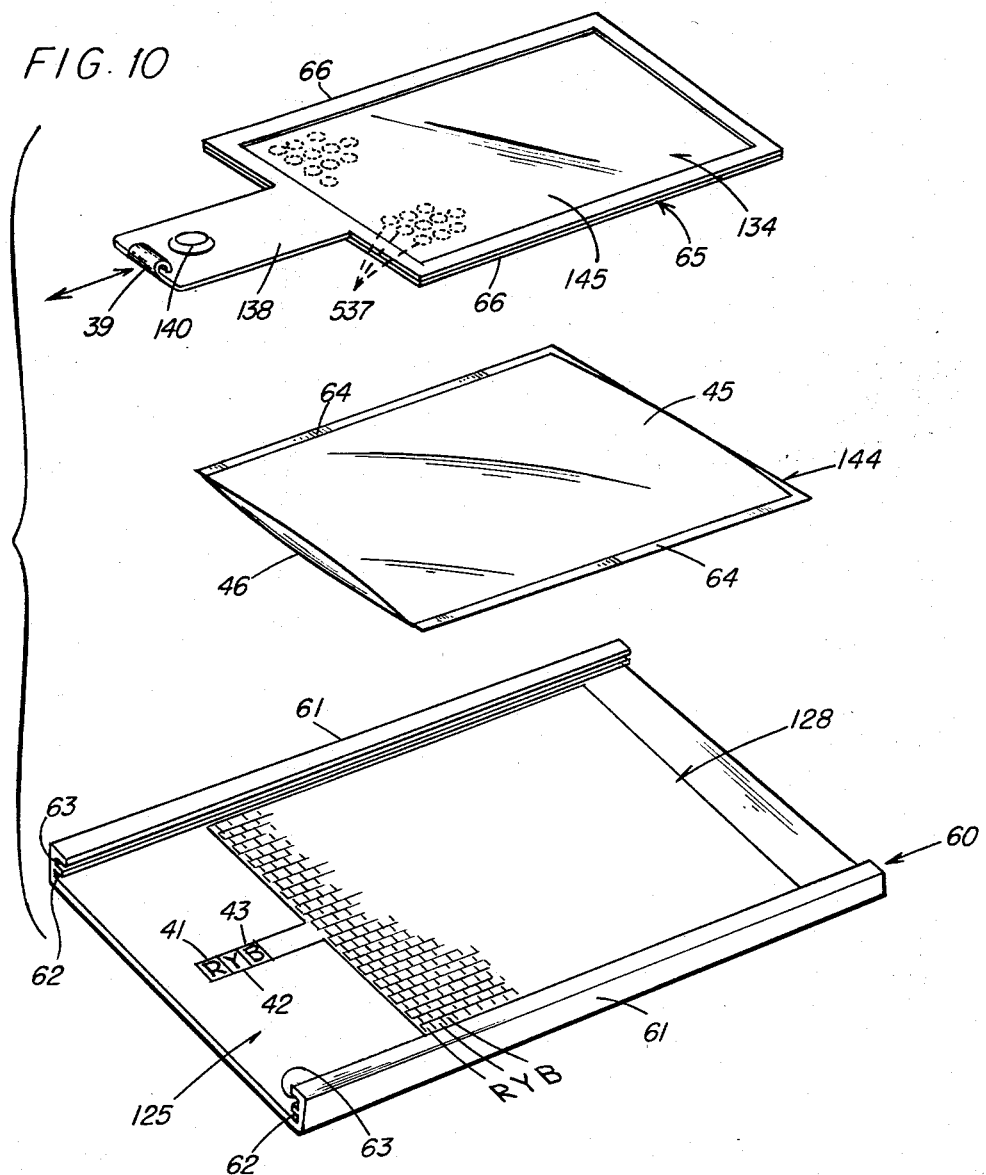
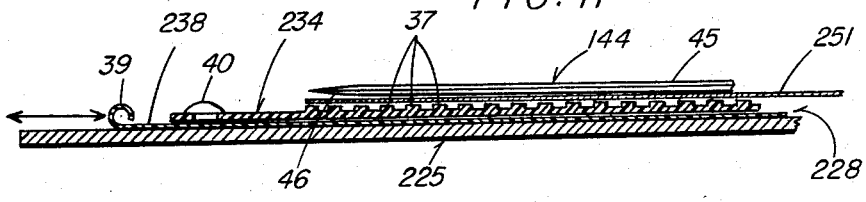

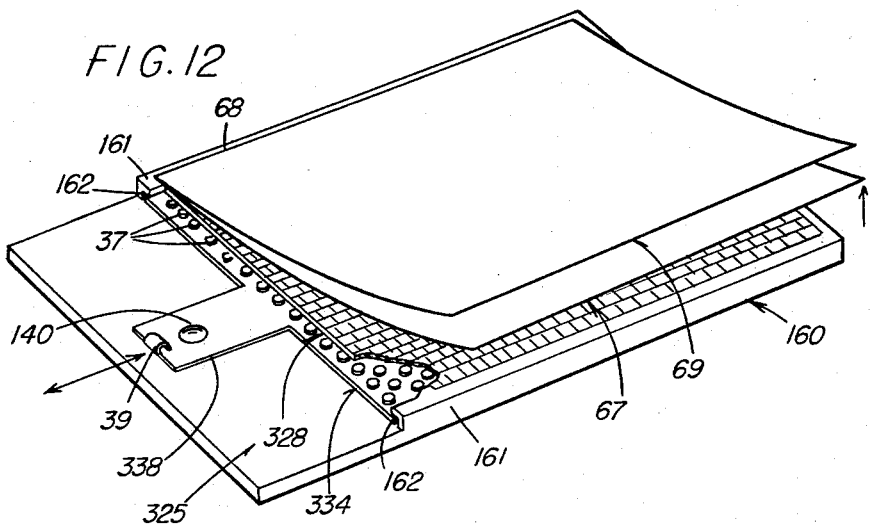
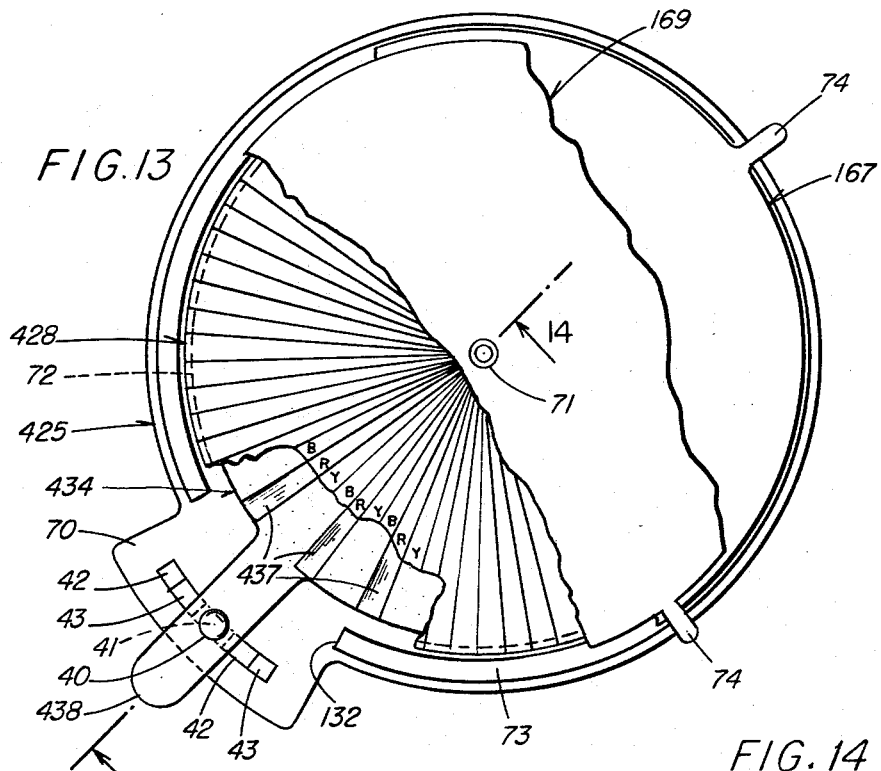
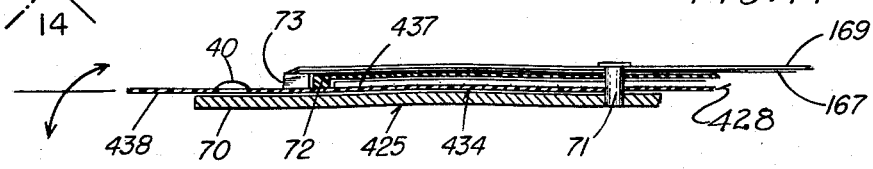

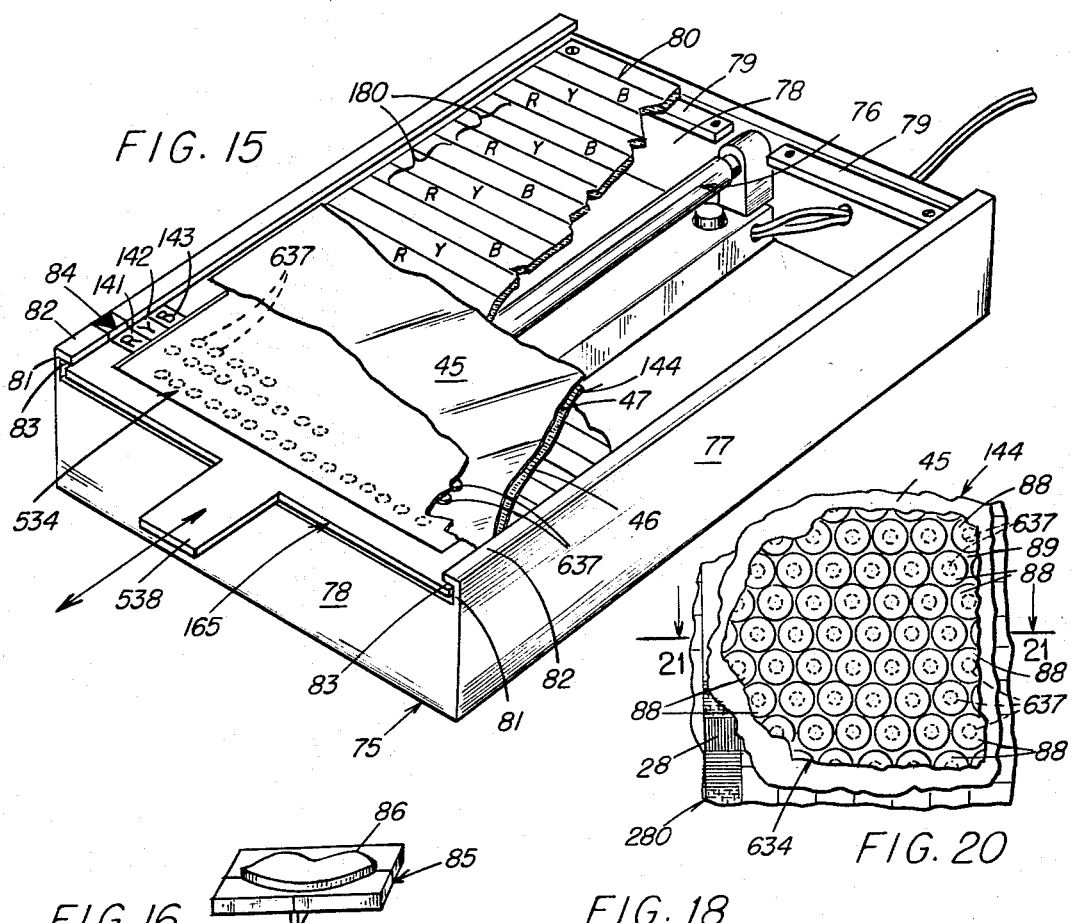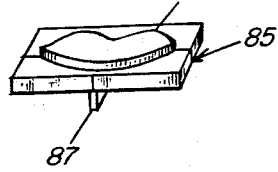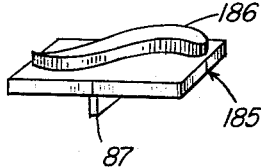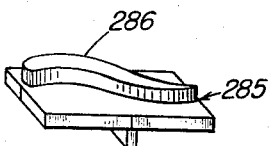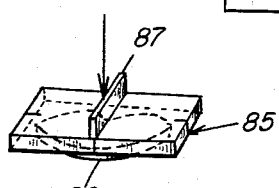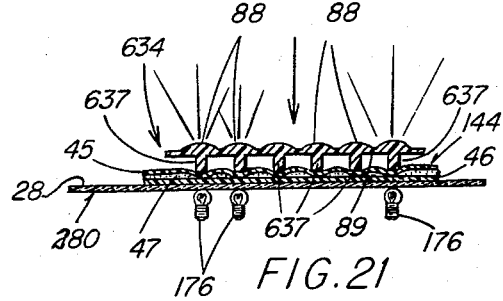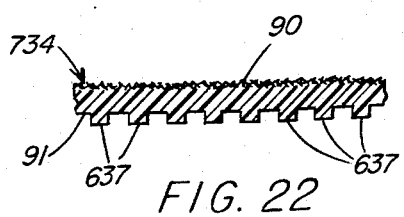

3,279,100
EXHIBITOR OF INFORMATIVE MARKINGS REMOVABLY APPLIED BY PRESSURE TO A DISPLAY SURFACE THEREOF
Philip H. Knott, New York, N.Y.
(Rte. 1, Koloa, Hawaii 96756)
Filed Apr. 2, 1964, Ser. No. 356,884
11 Claims. (Cl. 35—61)

The present invention relates to amusement and display devices which will exhibit at an observable face thereof informative markings temporarily formed on a face panel thereof by application of localized pressure alone to selected areas of the panel, and which may be obliterated without requiring removal of material such as by abrasion.

Prior to the present invention such devices have been proposed which basically are in either of two forms, and which are frequently referred to as Magic Slates.

In one form (I) of such prior Magic Slates proposals, a stiff backing panel supports and reinforces a releasing adhering surface of distinctive color, and is hereinafter called the temporary adhering sheet form. The releasing adhering surface may have a temporary face gripping affinity for an opposed overlaid surface of a covering impression means pressed thereagainst which by virtue of the characteristics of these surfaces may make unnecessary for temporary face adherence a tacky condition of either. Or one of these opposed surfaces may, for this purpose, carry tacky wax material. If the backing surface carries such tacky wax material the color pigment may be incorporated therein or the color pigment may be overlaid thereby when the wax material is of colorless transparency. The covering impression means is a substantially flat panel structure which may be in the form of a flexible facing impression sheet that may be caused temporarily to adhere to the tacky surface in selected areas when such areas of the former are firmly pressed against the latter. The overlying or facing impression sheet may be of flexible translucent plastic of limited but sufficient opacity effectively to hide the underlying wax-bearing and colored surface when not adhered thereto, and which is of a contrasting color (such as white or light gray). In this form, when pressure is applied to the overlying or facing impression sheet in an area of specific design, such as a symbol, by any suitable means, such as a non-transfer rigid implement or stylus, the back of the facing impression sheet will be temporarily adhered to the wax-bearing colored backing surface at the points of applied pressure there to provide one or more shaped "see through" or transparent "windows" through which the color of the backing surface may be observed, so as to display in such windows a faithful optical reproduction or image of the pressed design or symbol in the hue of the backing surface. This image may be obliterated by merely stripping the facing impression sheet free from the underlying wax-bearing and color-bearing backing surface, to recondition the Magic Slate for thereafter developing thereon other markings in like fashion. While the adhering tacky wax material may carry the color material of the backing surface when constituting a part of the backing panel, it may be in the form of a substantially transparent or "see through" and non-tinted coating on the back of the facing impression sheet with the backing color carried by or incorporated in the opposed backing surface. This type of Magic Slate is identified in the prior United States patents to Evans No. 1,455,579 of May 15, 1923, and Fischer No. 1,543,430 of June 23, 1925.

Embodiments of this temporary adhering sheet form may include an outer slick covering or protective, flexible transparent sheet of tough plastic material loosely laid over the facing impression sheet to have the marking implement or stylus pressed thereon for indenting or depressing the underlying impression sheet to prevent the latter from being scratched or damaged by drag of the implement or stylus thereover, with this covering sheet being manipulated or stripped with the impression sheet thereunder.

In the second form (II) of such prior Magic Slate the impression panel means or facing structure is in the form of a flat flexible envelope of transparent or "see through" plastic sheeting in which is confined between its top and bottom flexible wall sheets a layer of mobile, opaque viscous fluid or paste of a color contrasting with the color of the reinforced backing surface located therebeneath, and no intervening tacky wax coating is employed. This type of Magic Slate is hereinafter called the mobile paste envelope form. When pressure is applied at any particular point to the top sheet of the envelope it serves as a facing impression sheet which is forced thereat back to substantial contact with the bottom envelope sheet back by the reinforced backing surface, to cause lateral squeeze away or back flow of the mobile paste at this point there to form a "see through" window in the layer of paste through which the color of the backing surface may be observed. Such windowing may be performed in the form of designs, symbols, lines, etc. to image the shape of the pressured areas; and it may be obliterated by wiping the flexible top impression sheet of the envelope with the latter supported by the backing panel in a manner to spread the layer of confined paste over the windowed areas, such as by a roller or other equivalent spreading means. This form of the Magic Slate is disclosed in the British patent to Thomas No. 343,742 of February 26, 1931, for "A New Writing Tablet."

It will be understood that the pressure-defined windowed markings made visible on the face of such Magic Slate devices may be in the form of designs, symbols, letters, numerals, other indicia, lines of drawings and other pictorial representations, and the like, and the terms "marks" and "markings" are employed herein generically in identification of any and all such representations or images thereof as may be developed or produced by application of pressure at certain locations or isolated points to facing impression means or sheets of such devices.

It will be seen that any of these prior Magic Slate devices embodies a basic planar backing in the form of a reinforced or supported and relatively extended backing surface of seemingly certain hue (selected from all of the colors and including black and white), and a superimposed flexible impression panel or facing sheet selectively depressible in substantially all localized areas thereof and seemingly of sufficient opacity to hide the backing color when loosely overlying the backing surface, this impression sheet seemingly being of a hue contrasting with that of the backing surface. This reinforced backing surface and the flexible facing impression sheet are intervened with windowing means or a layer of windowing material which permits the seeming hue of the backing surface to be seen through the facing impression sheet only at window points where the latter is indented or depressed against the reinforced backing surface.

It is an object of the present invention to provide amusement or display devices each of which includes such a reinforced backing surface of seeming certain hue, a seemingly opaque flexible facing impression means of contrasting hue and intervening windowing means or layer, and embodies therewith supplemental pressure-localizing means that will permit certain of the depressed window areas to be observed as marks of a particular hue preliminarily selected from a plurality of different colors initially provided in the device and other certain of such marks to be observed in one or more of the other provided colors; or to allow the colors of the marks to be altered by physical manipulation of parts of such supplemental pressure localizing means. Thus an embodiment of the device may permit the development of a picture thereon with one part of one hue and others of other hues as may be dictated by the wishes of the manipulator, and modified forms thereof may permit the manipulator to change hues of such marks or parts thereof at will without requiring redrawing of the markings.

In order to assure attainment of this object, various embodiments of the present invention may provide support or frame means by which is supported or in which is mounted with the basic planar backing, the flexible impression panel or facing sheet and the intervening windowing means, a supplemental pressure-localizing means in the form of a laterally shiftable planar element (such as a sheet or plate) carrying spaced raised lands of appreciable rigidity (which may be arranged in separated rows) effectively to limit windowing depression of the impression sheet relative to the windowing layer and the planar backing to certain areas of the backing which are provided with a particular hue. For this purpose the spaced raised lands may be ribs or ridges, or buttons of small transverse dimensions, capable of little or substantially no deformation under pressure applied in the manual markings and spaced fairly close together. When in the form of buttons they may be small raised dots of any desired marginal shape and outline. These lands or buttons preferably are arranged in parallel rows with the rows being spaced certain critical distances and with the buttons in each row likewise spaced certain critical distances from each other.

There is associated with such pressure-localizing, land-bearing planar element or button sheet a particular arrangement of color on the face of the planar backing. In order to embody a great number of such small raised buttons on the surface of the pressure-localizing button sheet within a given area, the buttons in alterntae rows may be staggered. For example, let it be assumed that the buttons in the odd numbered transverse rows, such as one, three, five, etc., are aligned in the direction normal to the transverse rows thereof and the buttons in the intervening even numbered transverse rows, such as two, four, six, etc., are aligned in the normal direction half way between the alignments of the buttons in the odd numbered transverse rows. The face of the planar backings will be provided with a similar pattern of delineated areas or spots of color arranged in modified or compressed checkerboard fashion. A group of these delineated color areas or spots which will lie immediately beneath the buttons of the button sheet in one lateral position of the latter will all be of one color, such as the primary color red. In a second lateral position of the pressure-localizing button sheet the delineated colored areas lying immediately beneath the buttons will all be of another primary color, such as yellow. In a third lateral position of the pressure-localizing button sheet the delineated colored areas which lie immediately beneath the buttons will all be of the third primary color blue. Thus, each of the transverse rows of delineated colored areas on the face of the planar backing will have repeated groups of colors, e.g., red, yellow and blue; red, yellow and blue; red, yellow and blue; and so on. As a consequence, in the direction normal to the parallel transverse rows of delineated colored areas separate rows of the latter for each particular primary color will be arranged with these colored areas of the same color being separated in the normal direction by half sections of the other two primary colors. For example, in the normal rows of alignment of the red delineated areas each successive pair of red areas will be intervened by a half section of a yellow area and a half section of a blue area.

It will thus be understood that if the pressure-localizing button sheet is laterally moved in the direction of the transverse rows of buttons arranged thereon to align the buttons with only the red areas carried by the face of the planar backing and the effective pressure of an implement or stylus which is applied to the flexible impression sheet is limited to areas of the winding layer registered with the buttons, a pattern of the windows may be formed to define a mark imaged only by a series of red dots. In other words, the red color of the delineated areas on the face of the planar backing which are aligned with the pressure-localizing buttons will show through the windows. The windows will show blue when the pressure-localizing buttons are aligned with the blue delineated areas, or yellow when aligned with the yellow delineated areas, provided the windows are formed by pressure applied by the buttons when the buttons are arranged in alignment with these respective areas of a particular color.

Secondary colors may be provided by shading the primary colors of one hue into the primary colors of the next succeeding hue. For example, in the transverse direction the red areas may be shaded into the yellow areas through intermediate zones of orange, the yellow areas may be shaded into the succeeding blue areas through intermediate zones of green, and the blue areas may be shaded into the succeeding red areas through intermediate zones of purple. Thus the windowed areas may be provided with such secondary colors when the spaced pressure-localizing buttons of the button sheet are aligned with these spaced secondary color areas.

Various embodiments of the present invention may provide the different colored spots or areas of the face of the planar backing in various shapes, such as in the form of squares, circles, etc. It is not required that localized lands, such as buttons have the same transverse dimensions as such colored areas. For example, the varicolored backing surface may be printed in the form of squares arranged in staggered or compressed checkerboard pattern because of the simplicity of preparing or printing such a surface in this style. It has been found that with such a staggered or compressed checkerboard pattern of colors on the backing surface, the pressure-localizing button sheet may be provided with its spaced lands in the form of small disks or areas of circular outline of transverse dimensions greater than those of the colored areas. For example, if the circular buttons be of a diameter greater than the side dimensions of the colored squares, such as substantially equal to the diagonal distance between opposed corners of each of the squares or to encompass an area about one and one-half times greater than the area of each of the colored squares, the desired visual effects may be effectively attained. In cases where such circular buttons are larger than the underlying colored squares so that edge areas of each button overlap minor edge areas of colored squares adjacent the colored square over which the button lies, one may not be conscious of the exposure of such minor areas of differing colors in the edges of the button-formed windows, particularly at a reasonable distance of observation therefrom. One will be conscious chiefly of the predominant color occupying the major central section of the button area and often, even under concentrated effort of fixed observation, get the impression that there is only a slight edge shading to a complementary secondary hue. Also, while the use of a button sheet as the pressure-localizing means may produce as a line of a drawing a series of dots, optical response will cause an observer located at a reasonable distance away to have the impression that the series of dots constitute a substantially continuous line which merely has succeeding areas of color intensification.

When the pressure-localizing sheet is provided with the rows of lands in the form of continuous ribs or ridges which may extend in the normal direction and be spaced from each other in the transverse direction of lateral shift of the impression sheet the colored backing may have the primary colors arranged thereon in successive stripes extending in the normal direction. For example, the colored backing may have successive groups of colored stripes extending in the normal direction with each group consisting of three stripes successively colored red, yellow and blue. The transverse spacing between the stripes of the same color in successive groups dictates the transverse spacing between each pair of succeeding pressure-localizing ribs or ridges, so that the latter may be aligned at a particular time with only the red stripes, or only the yellow stripes, or only the blue stripes, upon proper lateral shifts of the pressure-localizing sheet in the transverse direction. In such an embodiment of the device the marking implement may be pressed against and moved over the impression sheet in a particular pattern that will encompass an area in which a plurality of such pressure-localizing rib lands are located. All segments of the pattern which are aligned with these ribs will be defined by windows formed in the windowing layer through which the backing color may be observed. If sections of the design are outlined by the marking instrument in directions involving skipping across the spaces between successive ribs there will be like spaces made in the windowing effect. However, these skip spaces do not detract from the effectiveness of the drawn design or pattern or its visual interpretation when the ribs and color stripes are of very small widths to minimize the spacings.

It will thus be understood that in color change embodiments of the present invention each of these devices embodies a pack, stack or sandwich of the required elements including the varicolored planar backing, the flexible impression facing sheet, the intervening windowing layer and the pressure-localizing means. The face of the planar backing is to carry a certain pattern of one color and at least another like pattern of a different color with the elements of the latter offset laterally from the like elements of the first pattern. Any additional color is to be provided in like pattern with its elements laterally offset from those of the other patterns. Each pattern of a particular hue may be in the form of a particular arrangement of separate spots thereof. The pressure-localizing sheet or plate structure embodied therewith will carry raised land structure arranged in similar pattern or so arranged as to be disposed in any particular lateral position of the pressure-localizing means in registry with areas of the pattern of only one of the colors at a time. These devices will embody means to shift laterally the pressure-localizing means relative to the other elements of the pack, either by moving the former relative to the latter or vice versa. The shifting can be accomplished either mechanically or manually.

In certain embodiments, such pressure-localizing sheet or plate will be located between the varicolored face of the planar backing and the windowing layer, with the lands thereof facing toward the latter. The selection and change of color will then be obtained by lateral manipulation of the pressure-localizing sheet or plate relative to the colored planar backing, the windowing layer and the flexible impression sheet, or conversely the pressure-localizing sheet may be held in a fixed position and the other elements simultaneously moved relative thereto. When such pressure-localizing sheet is so located between the varicolored face of the planar backing and the windowing layer the raised lands carried by the pressure-localizing sheet and at least the areas of the latter which are aligned with these lands must be of "see through" character so that the colors therebelow may be observed therethrough. Conveniently, the pressure-localizing sheet and its lands may be molded from transparent plastic for this purpose, and it may be relatively rigid or have some flexibility in the thin sections intervening the lands. In other embodiments the pressure-localizing sheet may overlie the flexible impression sheet and windowing layer, and for this purpose it must be reversed so that its lands will face downward toward the flexible impression sheet and windowing layer. For such overlying position of the pressure-localizing sheet the body thereof intervening the lands carried thereby should have relatively high flexibility since the back of this sheet (now serving as the top-most surface) will be engaged by the impression instrument and windowing pressure should be limited substantially to the lands lying immediately below the areas to which pressure is applied by the instrument in order to produce a fairly accurate reproduction of the drawn markings. Since in embodiments where the outer sheet is such a reversed pressure-localizing element at least the areas thereof which overlie the lands carried by the inner face thereof and these lands should be of "see through" character, and thus this element and its lands may be molded as a unitary structure from transparent plastic with the greater thickness of the lands providing the desired greater rigidity thereof.

Since it is possible to provide in certain embodiments the varicolored planar backing element as a flexible sheet if suitably backed by stiffening structure it is also possible to locate therein the pressure-localizing element behind such flexible varicolored backing sheet with its lands facing forward toward the latter. At least these lands are to have sufficient rigidity as to back localized areas of the varicolored backing sheet solidly. When the impression instrument is pressed against and moved over the flexible impression facing sheet it will cause windowing of the intervening windowing layer immediately above the lands thereto reveal the color of the areas of the varicolored backing sheet which lie immediately over the lands. In such devices the pressure-localizing element and its lands may be molded as a unitary plate structure from rigid plastic which need not be transparent if no passage therethrough of light rays are required by the intended service of the device. If the depth of observation from the front is to be limited to the face of the varicolored backing sheet this pressure-localizing element may be opaque. However, if the device is to be back-lighted then the pressure-localizing and land-bearing plate as well as the backing sheet must be transparent with the coloring of areas of the latter effected by light-transmitting stains. The latter is a requirement of all back-lighted embodiments regardless of the location of the pressure-localizing element in the sandwich or stack of sheet elements making up each such device.

It is another object of the present invention to provide embodiments thereof which can be used to advantage as amusement devices or toys, others as displays which may serve as color change or varicolored advertising devices capable of being altered at will, and still others as back-lighted structures having either amusement or advertising appeal.

It is a further object of the invention to provide structural embodiments which may be readily and economically constructed and which will permit efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a plan view of an embodiment of the present invention provided in the form of a framed, substantially flat pack having an intermediate obliteration panel (a portion of which is broken away) shown swung back or out to condition the impression area on which one is to apply marks in the use of the device, and indicating thereon a drawing developed by such marking;

FIG. 2 is a sectional view taken substantially on line 2—2 of FIG. 1, with all of the obliteration panel shown swung forward to intervening position in preparation for obliterating the applied markings;

FIG. 3 is an enlarged sectional detail, with parts broken away, of the right end portion of FIG. 2;

FIG. 4 is a perspective view of an obliterating device which may be used with the structure of FIGS. 1 to 3 incl. to cooperate with the obliteration panel for removal of markings applied to the face of the device;

FIG. 5 is a top plan view to smaller scale of the device shown in FIG. 1, and with the top impression structure swung upwardly to an oblique position so as to permit hinging out the obliteration panel, a portion of which is broken away to reveal a varicolored backing surface and a portion of an intervening pressure-localized element, the swung out position of the obliteration panel being indicated in dotted lines;

FIG. 6 is an enlarged perspective detail, with parts broken away, of a portion of the left hand end of the structure shown in FIGS. 1, 2 and 5 pertaining to a manual handle for laterally shifting the pressure-localizing means or button sheet, and indicating a lateral shift of the latter;

FIG. 7 is an enlarged view of the lower left hand corner of the pattern of colored areas applied to the varicolored backing surface shown in FIG. 5, with parts diagrammatically identified as to color and rows numbered for identification in the description;

FIG. 8 is a plan view of a broken away section of the Magic Slate envelope carrying the viscous fluid windowing layer shown in FIG. 1 as having the outlines or markings of a drawing applied thereto, and indicating the use of the obliteration device of FIG. 4 in removing the windows applied to outline the drawing illustrated in FIG. 1;

FIG. 9 is an assembly of strips, with parts broken away, of various modified forms of the pressure-localizing button sheet shown in FIGS. 1 to 3 incl., 5 and 6;

FIG. 10 is an exploded perspective view of a modified structural embodiment of the present invention;

FIG. 11 is an enlarged sectional view of one end of a further modified embodiment of the present invention, with parts broken away;

FIG. 12 is a perspective view of still another embodiment of the device of the present invention which employs a type of Magic Slate structure different from that illustrated in FIGS. 1 to 3 incl. and 5 to 11 incl.;

FIG. 13 is a plan view, with parts broken away, of a rotary embodiment of the present invention as distinguished from the straight line sliding embodiments illustrated in FIGS. 1 to 3 incl. and FIGS. 5 to 12 incl., and illustrating the use of raised lands in the form of ribs or ridges employed in substitution for spaced buttons;

FIG. 14 is a sectional view, with parts broken away, taken substantially on lines 14—14 of FIG. 13;

FIG. 15 is a perspective view, with parts broken away, of a back-lighted embodiment of the present invention;

FIGS. 16 to 19 incl. are perspective views of pressure-applying stamping devices which may be employed to outline certain conventional elements of drawings when used in connection with embodiments of the present invention;

FIG. 20 is a plan detail, with parts broken away, and FIG. 21 is a sectional detail of a portion of an embodiment including a modified form of pressure-localizing means or button sheet which may be used in certain embodiments of the present invention; and FIG. 22 is a sectional detail of a further modified form of pressure-localizing means useful in embodiments of the present invention.

Referring to the drawings in which like numerals identify similar parts throughout, it will be seen from FIGS. 1 to 8 incl. thereof that an embodiment of the mobile paste envelope form of the present invention may be of the following construction. The device depicted in FIGS. 1 to 3 incl. and 5 to 7 incl. includes a relatively stiff backing member 25 which may be in the form of a relatively thick and rigid plate of cardboard, fiberboard, plied layers of sheet material, etc., preferably substantially rectangular in shape, and which may be of greater dimension along a transversely extending edge 26 thereof than along end edge 27 extending substantially normal to such transverse edge, as will be understood from FIGS. 1 and 5. The top or front face of the planar backing member or plate 25 is provided with a varicolored backing surface 28, which may be in the form of a separate thin flexible sheet cemented to the top surface of the planar backing member.

As will be seen from FIGS. 5 and 7 the backing surface 28 has printed thereon a pattern of colored areas, with the rows thereof extending in the transverse direction (indicated by the double-ended arrow 29 and marked "T" in FIG. 5), consisting of groups of adjacent rectangular areas or spots successively colored the primary colors red, yellow and blue, and with this arrangement of the primary hues being repeated in the succeeding groups in each transverse row. It will be best understood from FIG. 7 that in the normal direction (indicated by the single-ended arrow 30 and marked "N" in FIG. 5), the transverse rows may be successively numbered "1," "2," "3," "4," "5," "6," "7," "8," "9," "10," etc., beginning at the lower right hand corner and numbering upwardly in the normal direction, as will be seen from FIG. 7. The odd numbered rows "1," "3," "5," "7," "9," etc., have their red areas, their yellow areas, and their blue areas respectively aligned in vertical rows in the normal direction. These odd numbered transverse rows are intervened by even numbered rows "2," "4," "6," "8," "10," etc., with the colored areas or spots therein staggered with respect to the colored areas or spots in the odd numbered rows. Consequently, each successive and vertically spaced pair of red areas or spots in a vertically arranged normal row are intervened by one half of a yellow area or spot and an adjacent one half of a blue area or spot in an intervening transverse even numbered row. Thus, all of the red areas or spots are aligned in vertical normal rows, all of the yellow areas or spots are aligned in different vertical normal rows and all of the blue areas or spots are aligned in still different normal vertical rows, to provide a staggered or compressed checkerboard pattern. As a consequence, the red areas or spots are arranged in a particular pattern and the yellow and blue areas or spots are arranged in similar patterns, but offset laterally from the former and from each other.

The face of the stiff backing member 25 also carries affixed thereto a rectangular frame 31 surrounding the varicolored backing area 28, which may also be formed from one or more layers of stiff material of the type suitable for the backing member, and an end section of this framing layer has a transversely-extending slot or gap 32 therein, as will be understood from FIGS. 5 and 6. The slot 32 is provided in the framing member 31 to receive therein for reciprocation a manipulative handle for reciprocating another planar member of the device, as will be more fully explained hereinafter.

Within the rectangular opening of or shallow recess 33 defined by the framing member 31 is slidably mounted a substantially rectangular pressure-localizing planar member or plate 34, which is of appreciably less transverse length than the recess 33 for reciprocative slide in the transverse direction therein. As will be best understood from FIG. 3 framing 31 may be formed of two layers with side sections 35 thereof undercut by making the lower layer narrower to provide along the inner edges thereof overhanging lips 36 beneath which side edge zones of the pressure-localizing planar member or plate 34 are slidably engaged to restrict movement of this plate to reciprocation in the transverse direction. The pressure-localizing plate 34 carries on the top face thereof a plurality of spaced raised lands 37, as will be best seen in FIG. 6. As is therein indicated, these lands 37 may be in the form of flat disks arranged in parallel rows extending in the normal direction and laid out in a pattern like the pattern of the areas of any single hue of the varicolored backing surface 28. Thus, in any given transverse position of the plate 34 the raised lands 37 may be aligned with only the red areas of the varicolored backing 28, in another lateral position aligned with only the yellow areas of the varicolored backing, and in a third lateral position aligned with only the blue areas of the varicolored backing.

The pressure-localizing planar member 34 has an elongated integral tab or handle in the form of a strip 38 slidably positioned in the slot 32 of the framing member 31. The handle strip 38 preferably carries a finger engaging enlargement or integral roll 39 for ready manual pushing and pulling thereof to shift the pressure-localizing planar member or plate 34 transversely between its three positions of alignment with the three different patterns of primary colors. The strip handle 38 preferably is apertured with the hole covered by a transparent convex lens 40 which may be successively aligned with three successive color guide index areas 41, 42 and 43 printed on the top face of the backing plate 25. In FIGS. 1, 2 and 5 the lens 40 is aligned with a red index area 41 to indicate that all of the disk lands or raised buttons 37 of the slidable pressure-localizing plate 34 are located over the red areas of the varicolored backing surface 28. If push is applied to the handle strip 38 by a means of the grasp roll 39 the lens 40 carried thereby may be brought to alignment with the next yellow index color area 42 therebeneath to indicate that the disk lens 37 are now aligned or laid over the yellow areas of the varicolored backing surface 28, as is the case in FIG. 6. Further inward push applied to handle strip 38 will bring the lens 41 to alignment with the third blue index color area 43 to indicate that in this third position of the pressure-localizing plate 34 its land disks 37 are now aligned or laid over the blue areas of the varicolored backing surface 28.

Since the hues of the patterned colored areas of the backing surface 28 are to be observed from the front of the device through the pressure-localizing plate 34 at least its land areas 37 must be of "see through" or transparent character for observation of the colored areas lying beneath these lands. Since it is also intended that, during the application of markings to effect windowing of the windowing means located above this pressure-localizing plate, the latter be shifted laterally so that one color may be observed through some of the formed windows and another color observed through other formed windows, the main body of the plate 34 must also be of a "see through" character or transparent. Consequently, the pressure-localizing plate 34 and its buttons 37 may be molded as a unit structure from suitable substantially rigid transparent plastic, such as a polystyrene or vinyl compound.

The device depicted in FIGS. 1 to 3 incl. and 5 to 7 incl. also includes a Magic Slate structure of the mobile paste envelope form, e.g., the type shown in the British patent No. 343,742 identified above. This subassembly consists of a flat envelope of transparent and flexible plastic sheet material 44, the top wall 45 of which serves as a flexible impression sheet. This flat envelope carries between its top and bottom walls 45 and 46 a relatively thick windowing layer of viscous and flowable opaque material or paste, indicated at 47 in FIG. 8, so that when it is spread evenly between the top impression sheet 45 and the bottom sheet 46 of this envelope, this planar unit effectively hides all structure therebelow. As will be explained more fully later, if the top impression sheet 45 is pressed downward in a localized area with the bottom envelope sheet 46 firmly supported in this area, the flowable viscous material or paste 47 constituting the windowing means will be squeezed out of this area to juxtapose the top impression sheet again this bottom envelope sheet there to form a window through which one may view anything therebelow.

Any suitable means may be employed for mounting the Magic Slate windowing envelope 44 upon the base structure 25, its varicolored top surface 28, the guide frame 31, and the slidable pressure-localizing button sheet 34. For example, guide pins may be employed to effect the desired alignment of planar elements when it is laid over the others. As is illustrated in FIGS. 1, 2 and 5, the marginal edges of the windowing means envelope 44 may be mounted in or secured to a reasonably rigid or stiff frame 48, which may be made of stiff cardboard or the like, and with this frame connected by a hinge 49 to an exposed edge 50 of the base plate 25. Consequently, the framed envelope 44 will, when folded down over the pressure-localizing button sheet 34, be properly aligned with the other elements of the stack of planar elements of this device, as will be seen in FIG. 1. This hinged mounting of the framed envelope 44 will permit it to be swung up to a position exposing the planar elements therebeneath, as in indicated in FIG. 5.

In order to facilitate obliteration of windows formed in the viscous opaque windowing layer 47 enclosed within the framed envelope 44, the embodiment of the device shown in FIGS. 1 to 8 incl. preferably may be equipped with a relatively stiff obliteration backing sheet or cardboard plate 51, which will nest in the recess 33 over the pressure-localizing button sheet 34, to provide a smooth, sufficiently rigid backing surface for the obliterating action. As is indicated in FIG. 5 one end edge of the obliteration backing sheet 51 may be connected by a hinge 52 to the adjacent edge of the framing member 31. In FIG. 5, the obliteration backing sheet 51 is shown in full lines in its nested position within the framing member 31, and when it is swung out from beneath the framed envelope 44, it may occupy a position similar to that indicated therein in dotted lines at 510, so that the framed envelope may be swung back down immediately over the button sheet 34 as is indicated in FIG. 1.

In operation of the embodiment of the device shown in FIGS. 1 to 8 incl., let it be assumed that the obliteration backing sheet 51 has been swung out of the stack in the manner proposed at 510 by dotted lines in FIG. 5 and as is indicated in full lines in FIG. 1. The conditioned device as depicted in FIG. 1 is then ready for use. One may then apply markings to the top impression sheet 45, which constitutes the top wall of the envelope 44, by any suitable known marking instrument, such as a stylus having a rounded blunt end. Let it be assumed that one wishes to lay out on the envelope 44 a plurality of lines, each provided as a series of successive small "see through" windows. The resulting scene may include a portion of a house shown at 53 in FIG. 1 with the outlines thereof to appear in red. The strip handle 38 will be moved to a position wherein the lens 40 is located above the red color guide or index area 41. This positions the buttons or raised lands 37 of the button sheet 34 over only the red areas of the varicolored backing surface 28. Pressure applied by the stylus to the envelope impression sheet 45 will cause it to be depressed along the lines of applied pressure so that over each of the buttons that is in the path of the stylus the flowable viscous windowing material 47 will be squeezed out in this area there to provide a window, such as that indicated at 554 in FIG. 8. The red color of the varicolored backing surface 28 will thus be observable through each of the windows 54 as a red spot when one looks through the latter and down through the intervening transparent button 37 and the pressure-localizing sheet 34 carrying it.

In order to add to this drawing an image of a yellow sun or moon, such as that indicated at 55 in FIG. 1, the strip handle 38 will be pushed inwardly to locate the index lens 40 over the yellow index area 42, so as to align the button lands 47 of the pressure-localizing sheet 34 over the yellow areas of the varicolored backing surface 28. The outline of this sun or moon image 55 will then be impressed upon the flexible facing sheet 45 as a circle drawn with the use of the blunt end stylus to define a circle of small windows through which the yellow areas of the backing surface may be observed as yellow spots.

If the pictorial drawing is to include an image of a portion of a lake and the shoreline thereof, such an area indicated at 56 in FIG. 1 may be drawn thereon with the stylus after the pressure-localizing sheet 34 is again shifted transversely to the right to align the index lens 40 with the blue index area 43. This action now aligns the button lands 37 of the pressure-localizing sheet 34 with only the blue areas of the varicolored backing surface 28, so that when pressure is applied thereover windows are formed in the windowing layer 47 through which the blue color may be observed as blue spots.

In the event that it is desired to add a ground line and shrubbery, such as a tree, as is indicated at 57 in FIG. 1, and it is desired to make these parts or portions thereof appear to be green, the manual slide 38 may be shifted out only a half stroke so that the index lens 40 will lie over the meeting edges of the index areas 42 and 43, thereby lapping approximately one-half of each of the yellow and blue areas. As a result, the button lands 37 of the pressure-localizing sheet 34 will be positioned over the adjacent sections of the yellow and blue areas of the varicolored backing sheet 28, to exposure through windows impressed thereover small circles which are blue in one half section and yellow in the other half section thereof, to appear to be green. At a reasonable distance away from a small spot of color, if sections of the spot are one color and other sections of another color, one's eyes tend to blend these colors together in viewing them. By the same token blended colors may be employed for other parts of the drawing, such as sections of the house image 53, so that wall areas thereof may be made to appear to be red while the roof areas thereof may be made to appear to be orange by slightly shifting the slide for forming the windows outlining the roof areas to alignment of the index lens 40 over one-half the red index area 41 and a half of the adjacent yellow index area 42.

In order to "wipe out" or obliterate the image outlined on the flexible impression top sheet 45 of the mobile paste envelope 44, the operator may lift the latter and its frame 48, or swing this subassembly upward to the open position illustrated in FIG. 5, and then swing the obliteration backing sheet or card 51 back into its nested position, illustrated in this figure, to underlie this envelope when it is swung back down to the initial position depicted in FIG. 1. The roller 58 of FIG. 4 may be employed for this purpose in the manner illustrated in FIG. 8. The roller will be pressed against and slid across the surface of the top impression sheet 45 while the envelope backing sheet 46 is suitably supported in a firm manner by the obliteration backing sheet or card 51. This will cause flow of the viscous opaque material or paste 47 forward into gradually to fill up the windows 54 in the manner depicted at 59 in FIG. 8. After all of the windows of the preceding drawing or the markings thereof have been obliterated in this manner by flowing the windowing paste thereacross, the operator may then manipulate the device of FIGS. 1 to 8, incl. in the same fashion for the development of subsequent markings or another pictorial representation.

It is illustrated in FIG. 9 that the pressure-localizing lands, when of the type of small isolated areas spaced from each other in all directions, may be of a variety of or any desirable outline. Four strips of such pressure-localizing button sheets are shown in FIG. 9. The first strip 134 illustrates the button lands 137 in the form of rectangles or squares. The next strip 234 illustrates the button lands in the form of triangles 237. The third strip 334 illustrates the button lands 337 in the shape of diamonds. The fourth strip 434 illustrates the lands 437 in the form of ovals. It will be understood that any desirable shape or outline of such localized lands may be selected in the practice of the invention.

In the embodiment illustrated in FIG. 10 the stack of elements includes a tray member 60, the bottom of which is in the form of a plate 125 which serves as the substantially rigid backing sheet. Opposed sidewalls of the tray 60 may be in the form of parallel, upstanding rails 61, each provided on its inner face with a pair of longitudinally-extending channels 62 and 63. The top surface of the backing sheet 125 will be provided with the varicolored backing surface 128, such as by suitable printing technique, and the arrangements of the spots of the three primary colors red, yellow and blue therein may be similar to that taught in FIGS. 5 and 7. In the printing process the index or guide areas 41, 42 and 43 may be provided also on the top surface of the backing sheet 125.

In the FIG. 10 embodiment the Magic Slate subassembly may be of the mobile paste envelope form, depicted at 144, including flexible top sidewall sheet 45 and flexible bottom sidewall sheet 46 between which the windowing layer of viscous paste is confined. Seam side edges 64 of the mobile paste envelope 144 may be slidably receivable in the pair of opposed lower channels 62, so that the bottom sidewall sheet 46 of the envelope rests upon the varicolored backing surface of the printed area 128.

In the embodiment of FIG. 10 the position of the pressure-localizing planar member which carries the separated lands is changed in the stack of planar elements. In this embodiment it is to be laid over the mobile paste envelope 144 to constitute the topmost planar element. This pressure-localizing member may be in the form of a rectangular frame 65 carrying therein a transparent flexible plastic sheet 134 with its top surface 145 serving as the flexible impression sheet. The bottom surface of the flexible impression sheet 145 is provided with or carries the pressure-localizing buttons 537 to lie over and rest upon the top sidewall sheet 45 of the mobile paste envelope 144. Opposite side edges 66 of the rectangular frame 65 are slidably received in the opposed channels 63 of the tray 60. The frame 65 carries a manual handle 138 supporting an index lens 140 over a hole therein to be selectively positioned above any of the index areas 41, 42 and 43 as may be desired by transverse or longitudinal sliding translation or reciprocation of this unit above the mobile paste envelope 144.

After assembly of the planar members 144 and 65 in the tray 60 in the indicated manner, the button lands 537 may be selectively aligned with colored areas or spots of the vari-colored backing 128 of a single primary hue by aligning the index lens 140 with the index colored area of a matching hue which indicates this positioning. Markings will then be applied with a blunt end stylus to the top surface 145 of the inverted pressure-localizing planar sheet 134 to cause the lands 537 to window the opaque viscous paste within the envelope 144 over the areas or spots of selected color. The color thereof will be observable through the transparent bottom sidewall sheet 46 of the envelope, the windowed areas of the windowing layer confined in the envelope, the transparent top sidewall sheet 45 of the envelope, the transparent button lands 537 which are aligned with and cause production of the windows, and the transparent body of the button-bearing sheet 134 overlying the pressed buttons. In order to produce windows which are aligned with different colored areas or spots of the varicolored backing 128 one may apply manual thrust or pull to the handle 138 by grasp of its knob 39 for transverse translation of the inverted button slide 65 to align its button lands 537 with another selected color. The windowing impression procedure is then repeated.

In the FIG. 11 embodiment all of the planar members of the stack or sandwich are to be held fixed relative to each other except that the varicolored backing plate is to be translated laterally in the stack. The relatively stiff backing plate 225 has slidably mounted above its top surface a plate 228 which has its upper surface provided with the varicolored areas or spots. A manual handle 228 extends from one end of the varicolored backing plate 228 and carries a manual knob 39 for reciprocating this plate back and forth. The pressure-localizing planar element is in the form of a plate 234 which is supported in fixed relation to the base plate 225 with the varicolored backing plate 228 slidable therebetween. The button lands 37 of the pressure-localizing plate 234 are positioned uppermost and are temporarily overlaid by an obliteration plate 251 which is to be removed in use of the device as is explained above in connection with the FIGS. 1 to 8 incl. embodiment. The magic slate element is in the form of a mobile paste envelope which may be similar or like that depicted at 144 in FIG. 10. The top and bottom walls 45 and 46 of the envelope 144, between which is confined the opaque windowing paste, the pressure-localizing planar element 234 and its button lands 37 all will be formed of "see through" or transparent material.

In operation of the embodiment illustrated in FIG. 11, the markings will be developed by applying the blunt end stylus to the flexible top wall 45 of the mobile paste envelope 144. Each land 37 provides a localized rigid backing for the bottom wall sheet 46 of the envelope 144 so that pressure applied to the top wall impression sheet 45 of the envelope will cause it to be pushed down to adjacency of this bottom sidewall sheet with squeeze out of the intervening paste in this area, there to form a window. As a result, the color of the spot of the varicolored backing slide 228 which lies immediately beneath such button land 37 that caused the formation of the window immediately thereabove will then be observable through this window. By shifting the varicolored backing slide 228 the windows may be selectively formed to be aligned with different colors as they are brought to alignment with the windows.

As has been previously indicated the practice of the present invention is not limited to magic slates of the mobile paste envelope form. An embodiment of the present invention is illustrated in FIG. 12 which employs the Magic Slate in the temporary adhering sheet form. In the assembly shown in FIG. 12 a tray member 160 is provided which includes a stiff backing plate 325 supporting upstanding side rails 161 provided with opposed channels 162. A pressure-localizing planar member or plate 334 has its side edges slidably received in the opposed channels 162, and carries a manual handle 338 for sliding or reciprocating it back and forth across the top surface of the backing plate 325 by means of push or pull applied to the knob 39 carried thereby. The handle strip 338 is provided with a hole over which is carried index lens 140 to be selectively aligned with index color areas located therebelow on the top surface of the backing plate. Pressure-localizing plate 334 carries the land buttons 37 on its top surface.

In the FIG. 12 embodiment the varicolored backing sheet 328 is in the form of a highly flexible transparent or opaque sheet having its opposite side edges loosely supported by the rails 161. The Magic Slate structure in the form of a temporary adhering sheet is provided as a flexible, seemingly opaque, plastic sheet 67 and an opposed transparent waxy layer on or overlying the varicolored backing sheet 328 for temporary adherence thereto when pressed thereagainst. The Magic Slate sheet 67 preferably is affixed along one edge, in the vicinity of the line 68, to the top of one of the rails 161, and with its other three edges free so that it may be peeled and swung upwardly away from the wax coated varicolored backing sheet 328. For protective purposes the windowing impression sheet 67 is overlaid with a transparent flexible plastic sheet 69 which may also have one of its edges affixed to the top of one of the rails 161 along the line 68.

In the use of the device of FIG. 12 the pressure-localizing plate 334 will be adjusted by means of its handle 338 to align its button lands 337 with areas or spots of one selected color carried by the flexible backing sheet 328, as may be dictated by observation of the selected color through the index lens 140. Markings will be applied by pressing a blunt end stylus upon the protective top sheet 69 to cause the windowing impression sheet 67 to be depressed along the lines of applied pressure. Wherever the varicolored backing sheet 328 is rigidly supported by the button lands 37 the layer of transparent waxy material on this backing sheet will cause temporary adherence of the windowing sheet 67 to the colored areas or spots of the varicolored backing sheet lying immediately above these button lands. As a result, the hue of the colored areas or spots of the varicolored backing sheet 328 which is temporarily adhered in this fashion to the bottom face of the windowing sheet 67 will be made apparent through the latter at the adhered points, to be observed through the top protective sheet 69. Shift of the pressure-localizing plate 334 may then position its button lands 37 behind colored areas or spots of the varicolored backing sheet 328 which are of a different hue so that this color will show through when pressure markings are applied. Since the pressure-localizing plate 334 is located behind the varicolored backing sheet 328 there is no need for it to be made of "see through" or transparent material, and this varicolored backing sheet may also be opaque since only the colors applied to its top surface are to be observed through the protective sheet 69 and the windowing sheet 67. The markings which are applied to the face of the device of FIG. 12 are obliterated by peeling upward the windowing sheet 67 and its protective top sheet 69, so as to separate its bottom face from the temporarily adhering waxy material on the face of the varicolored backing sheet 328, in the manner therein illustrated.

Practice of the present invention is not limited to straight line translation of a planar or sheet element in the stack of the planar members of the device. Such translation may be rotary, as is proposed in FIGS. 13 and 14. It is also illustrated in FIGS. 13 and 14 that the pressure-localizing lands need not be in the form of small localized raised areas spaced in all directions from similar lands. It is therein illustrated that such lands may be in the form of tapered ribs spaced laterally from each other. The device of FIGS. 13 and 14 includes a relatively stiff backing plate 425, which may be generally disk-shaped and having a projecting sector or panel 70 extending from the edge thereof at one location. The projecting panel 70 is provided with an arcuate series of index color areas 41, 42 and 43, bearing the primary hues, red, yellow and blue respectively.

In the FIGS. 13 and 14 embodiment the pressure-localizing plate 434 is provided in the form of a rotary disk pivotally supported by suitable pivot pin means 71 to the center of the backing disk 425, and carries on the edge thereof a radially-extending manual arm 438 provided with index lens 40 for cooperation with the color index areas 41 to 43 incl. The pressure-localizing disk 434 carries circumferentially-spaced, radial ribs 437 which serve as the pressure-localizing lands. Each land rib 437 is tapered on its sides and is of a particular width at its outer end with the sides thereof converging inwardly to the pivot point, and the circumferential spacing between these ribs is a multiple of a certain width of a colored zone of the varicolored sheet embodied in this device, as is explained later.

In the FIGS. 13 and 14 embodiment the varicolored backing sheet is in the form of a highly flexible disk 428 which carries on its top surface succeeding groups of radial sectors with each group consisting of three tapered stripes of the primary colors red, yellow and blue, and with this same arrangement being repeated in the succeeding groups. Each colored sector preferably is of a shape and width substantially that of each of the ribs 437. Since it is intended that one of the primary color sectors of one group be disposed over one rib 437 and the sector of the same color in the next group be disposed over the next succeeding rib the space between these two ribs may be substantially equal to the area covered by two of the radial color stripes of the other different colors of the varicolored backing disk 428. The peripheral edge of the varicolored backing disk 428 is suitably supported by annular rib means 72 mounted on the backing disk 425 so as to permit the pressure-localizing disk 434 and its ribs 437 to rotate freely therebeneath while being spaced only slightly above these ribs. In the area of the radially projecting handle 438 the annular supporting rib 72 is notched on its underside so as to permit free rotary swing through a limited arc of this handle therebeneath, to an extent at least sufficient to translate it through a radial angle equal to two-thirds of the radial angle occupied by a single group of the red, yellow and blue sectors or stripes.

In the FIGS. 13 and 14 embodiment, the varicolored backing disk 428 is loosely overlaid by a Magic Slate or windowing impression disk 167 of flexible sheeting of seemingly opaque material which carries on its undersurface a layer of temporary adhering waxy material to be pressed against, for adherence to, underlying areas of the varicolored backing disk 428. The peripheral edge of the disk 167 may be freely supported on an upstanding annular sidewall 73 having a gap 132 therein in which the handle 438 may swing. For complete circumferential support of windowing disk 167 the gap 132 in annular rib 73 may be provided as a notch in its underside to leave a bridge extending thereover. A protective disk 169 of transparent material may loosely overlie the impression disk 167.

In use of the device of FIGS. 13 and 14 markings may be applied to the windowing impression disk 167 by pressing upon the protective disk 169 with a blunt end stylus. This will cause the waxy layer on the underface of the windowing impression disk 167 to adhere to areas of the varicolored backing disk 428 wherever the latter is backed up by ribs 437 of the pressure-localizing disk 434, there to provide transparent windows through which the color of the varicolored backing disk may be observed. This is similar to the operation attained by the device of FIG. 12 except that marks which are formed generally radially of the structure of FIG. 13 along lines located above ribs 437 will appear as linear windows through which lines of the underlying color may be seen, and there will be gaps in the marking lines wherever they are formed in a circumferential direction across from one rib to the next succeeding rib. The peripheral edge of the windowing impression disk 167 preferably will be provided at circumferential points with extending tabs 74 which may be easily engaged by one's fingers for peeling it upward away from the varicolored backing disk 428 to separate the temporary adhering layer from the top surface of the latter after use of the device. It is to be understood that instead of employing in the device of FIGS. 13 and 14 the temporary adhering sheet form of the Magic Slate a suitably designed mobile paste envelope of the type previously described may be substituted for the disks 167 and 169.

FIG. 15 illustrates an embodiment of the device which is suitable for back lighting. Back lighting requires that all layers of material intervening the source of light and an observer, except the windowing layer, be at least translucent for transmission of light rays therethrough. In the embodiment of FIG. 15 the device includes a base structure 75 in the form of a rectangular shallow box in which is supported a suitable light source 76. Suitable ledge means may be provided along margins of the side and end walls 77 and 78 within the box 75, such as strips 79 to support thereon the edges of a relatively stiff light ray-transmitting backing plate structure 80. The backing plate strucure 80 may be in the form of a transparent sheet of glass or stiff plastic and its top face serves as the varicolored backing surface provided with the patterns of primary colored areas. Such colored areas may consist of laterally-extending parallel stripes of uniform width tinted the desired hues while being capable of transmitting light rays so that the latter will appear to be of the color of the tinted stripes. These transverse stripes preferably are provided in repetitive groups 180 each consisting of three arranged in the same order of related hues, such as red, yellow and blue, red, yellow and blue, etc.

In the FIG. 15 structure each sidewall 77 is provided with an upstanding extension 81 having an inwardly-extending, overhanging lip 82 so as to define above the ray-transmitting backing plate 80 a pair of opposed channels 83 which slidably receive opposite edges of a frame 165 carrying a manual handle 538 for reciprocating or sliding this frame longitudinally in the channels. Frame 165 supports a highly flexible, light ray-transmitting sheet of plastic, or the like, which serves as the pressure-localizing planar element 534, carrying on its undersurface a plurality of button lands 637 extending downwardly in inverted position. Between the pressure-localizing framed slide 165 and the light ray-transmitting plate 80 is located a Magic Slate planar member which may be in the form of a mobile paste envelope 144 carrying between its flexible transparent top wall sheet 45 and its transparent bottom wall sheet 46 an opaque layer of viscous mobile paste 47.

A side edge of the slide frame 165 may carry a plurality of colored index areas 141, 142 and 143 to be selectively aligned with an index mark 84 carried on the far overhanging flange 82, to dictate the positioning of the slide 165 for locating its inverted button lands 637 selectively over particular colored stripes of the backing plate 80.

In order to apply removable markings to the FIG. 15 back-lighted device the slide frame 165 will be moved or slid longitudinally in channels 83 to alignment of one of the color index marks 141, 142 and 143 with the index mark 84 to provide a showing of a selected color in windowed areas. A blunt end stylus will then be applied to the flexible pressure-localizing sheet 534 to press certain of its buttons down against the mobile paste envelope 144, so as to window its windowing layer 47 immediately beneath the pressed buttons. As a result, wherever the windowing layer 47 is windowed light rays will be transmitted therethrough from the interior of the box 75 which is lighted by light source 76, to be tinted the color of the stripe of the backing plate 80 which is located in alignment therewith. Shift of the pressure-localizing frame planar element 165 will permit other windows to be formed in the same fashion opposite stripes of other colors. In this manner certain sections of windowed markings may be given one hue and others another hue. The windows may be removed or obliterated by retracting the framed slide 165 to expose the top wall sheet 45 of the mobile paste envelope 144, for application thereto of wiping action to fill in the windows, such as in a manner similar to that explained above in connection with FIG. 8. It is to be understood that back lighting may be embodied in various modified forms of the invention, such as variations of those proposed hereinbefore so long as the planar elements intervening the light source and a point of observation to the front are of a character to transmit light rays except the windowing layer of seeming opacity.

While it has been proposed above to employ a blunt end stylus as an instrument for drawing markings on the face of embodiments of the present device it is possible to employ for this purpose other pressure applying means which may be in the form of structures similar to stamps having raised areas. As is illustrated in FIGS. 16 to 19 incl. such pressure-applying units may each be in the form of a rigid block carrying a raised land having the outline of a simultation of a conventional element. For example, the pressure applying block 85 of FIGS. 16 and 17 may bear on the face thereof a raised area or land 86 which may have the shape of the conventionally recognized image of a person's lips. The back side of the block 85 may carry a finger engaging member 87 to facilitate the handling and manipulation thereof. When such a pressure-localizing block 85 is employed in the inverted position of FIG. 17 its contoured land 86 engages the outer flexible element or impression sheet of the embodiment of the device with which it is used, for example that illustrated in FIGS. 1 to 3 incl. and 5 to 7 incl. When the block 85 is pressed inward or down it causes pressure to be applied to the land buttons 37 which lie immediately beneath the block land 86, so as to define a similar contoured area by the windows formed as a result of the application of pressure to the button lands in such contoured area. In FIG. 18 is shown a similar pressure-applying instrument block 185 which bears on its face a contoured land 186 that is to define an area of windows simulating the image of a right eyebrow. The pressure-applying block 285 of FIG. 19 bears a contoured pressure-applying land 286 which will produce the simulation of a left eyebrow.

It is indicated in FIGS. 20 and 21 that back-lighted embodiments of the device, which may be similar to that illustrated in FIG. 15, may be improved as to visual results by equipping the pressure-localizing planar element, which is the outermost plate therein, with light ray spreading lenses. A relatively rigid backing plate 280 may be similar to that proposed at 80 in FIG. 15, being of a character so as to transmit light rays therethrough, and having its top surface provided with patterned color areas, such as of the compressed checkerboard pattern illustrated in FIG. 7. The pressure-localizing sheet 634 carries on its underface the button lands 637, and this planar member differs chiefly from that shown at 534 in FIG. 15 in providing over each button land a convex lens element 88, preferably arranged coaxial therewith. The main body 89 of this button-bearing sheet where it intervenes the disconnected lenses 88 is of relatively thin section and the material thereof is of such character as to assure relatively high flexibility so that when pressure is applied to any individual lens it will cause the button 637 coaxially located therebeneath to be sufficiently depressed as to window the opaque mobile paste layer 47 without effectively windowing adjacent areas located beneath the surrounding buttons. The pressure-localizing planar member 634 will, of course, be formed of light-transmitting material and, for this purpose, it may be molded as an integral unit from suitable transparent or translucent plastic which is relatively rigid in thick section and relatively flexible in thin section.

It is illustrated in FIG. 21 that in such a back-lighted embodiment featuring ray-diverging lenses 88 a bundle of light rays will be transmitted through the color bearing back plate 280 in a localized area lying immediately beneath a window pressed into the opaque mobile paste windowing layer 47 by the land button 637 located immediately thereabove. In FIG. 21 each of such bundle of light rays is illustrated diagrammatically by the pictorial representation of a small separate light source 176 as being the full equivalent thereof. The light rays from each such light source 176, or the small isolated bundle serving as such, will be transmitted through the transparent flexible wall 46 of the mobile paste envelope 144, the window formed in the mobile paste windowing layer 47 and the top flexible envelope wall 45, all aligned therewith, finally to be transmitted up through the pressure localizing land button 637 which formed this window and its superposed lens 88. The light rays will divergingly emit from this lens 88 to provide an observable glow spot appreciably larger than a brighter and smaller light spot which would be produced in the absence of such emergence lens. As a result, when an elongated line mark is defined by dragging the blunt end of a stylus over a series of such lenses 88 their buttons 537 are caused to press inward and form an aligned row of windows. The diverging light rays emitted from the aligned row of lenses 88 over the pressure formed windows will merge at meeting margins of successive light spots so as to define the mark as a back-lighted, continuous line. If the point of observance is relatively close to the face of the device and the lenses 88 carried thereby, such a continuous lighted line may appear to have successive areas of enlargement and emphasis, but as the distance between the device and the point of observance is increased awareness of successive emphasis of localized lighting will be gradually reduced.

A somewhat similar result may be obtained in a back-lighted embodiment of the present invention if the outer face of the inverted pressure-localizing planar member be roughened rather than provided with localized convexed lenses 88 of FIGS. 20 and 21. Such a structure is illustrated in FIG. 22 wherein it is indicated in magnified form that the outer face 90 of the flexible pressure-localizing planar member 734 is roughened or etched. Such pressure-localizing planar member 734 may be molded from suitable flexible light-transmitting or transparent plastic material with the localized button lands 637 molded integral with the bottom face 91 thereof. In the molding operation the planar member 734 may initially be provided with a smooth outer face. By a separate operation, this smooth outer face may then be mechanically roughened or chemically etched to provide the broken-up or rough surface 90 which will cause transmitted light rays to be bent in various directions upon emergence.

Embodiments of the present invention are not restricted to the use of slides of the type illustrated in the drawings. For example, let it be assumed that an embodiment is provided with a base structure equipped with a marginal flange similar to 82 of FIG. 15, and with this marginal flange provided with one or more index marks like 84. A group of separate pressure-localizing transparent sheets, each carrying inverted land buttons on its undersurface, may be substituted for the slide 165. One such pressure-localizing sheet may bear an index mark to be aligned with index mark 84 when this inverted planar member is laid over the face of the device with a marginal edge thereof abutted against the inner edge of flange 82. In such position this pressure-localizing sheet may present its depending pattern of localized button lands alignment only with red areas of the varicolored backing surface. Any window-forming pressure which is applied to the top face of this pressure-applying sheet will thus window the underlying windowing layer only above red backing surface areas. A companion inverted, pressure-localizing sheet will be of similar construction with its inverted pressure-localizing button lands arranged over only blue areas of the varicolored backing surface when the index mark carried by this second pressure-localizing sheet is aligned with the flange index mark 84. A third inverted pressure-localizing sheet will perform the same function with respect to only yellow areas of the varicolored backing surface.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Exhibitor of informative markings removably applied by pressure to a display surface thereof comprising in combination with
(a) a relatively extended stiff backing means, a superimposed depressible flexible impression panel seemingly of limited opacity and certain hue loosely overlying and hiding said backing surface, and intervening planar windowing means to permit observation of the backing means through the impression panel at points of pressure depression of the latter which there windows the intervening means, of
(b) a backing surface carried by said backing means facing toward said windowing means, said backing surface being provided with a certain pattern of colored areas of a certain hue and at least one additional similar pattern of colored areas of a different hue with the parts of the additional pattern offset laterally in a certain direction from the the similar parts of the first-mentioned pattern at a uniform spacing in this lateral direction;
(c) said patterned varicolored backing surface, impression panel and intervening planar windowing means forming a stack of planar elements;
(d) a pressure-localizing planar member embodied in said stack and bearing on one face thereof a fixed pattern of spaced pressure-localizing raised lands facing toward said planar windowing means with said lands arranged in a pattern for alignment with at least portions of the colored areas of one of the hues in a particular relative lateral position and for alignment with at least portions of the colored areas of the other of the hues in another particular relative lateral position,
(e) all of the planar elements of said stack intervening said pressure-localizing lands and said windowing means being flexible for effective localized windowing pressure between said lands and windowing means; and
(f) means to shift laterally one of said varicolored backing surface and said pressure-localizing planar member relative to said planar windowing means in the same lateral direction of offset of the parts of the two differently patterns between the two relative positions,
(g) all planar elements in said stack intervening said varicolored backing surface and a point of observation outward of the top of said stack being of "see through" character.

2. The exhibitor of claim 1 in which said backing surface is provided with three like patterns of differently colored areas with the parts of each pattern offset laterally in the certain direction from like parts of the other patterns at substantially equal lateral distances.

3. The exhibitor of claim 1 in which the pattern of spaced raised lands is similar to the pattern of colored areas of each like hue.

4. The exhibitor of claim 3 in which the backing surface is provided with three like patterns of differently colored areas with the parts of each pattern offset laterally in the certain direction from like parts of the other patterns at substantially equal lateral distances and with the pattern of spaced raised lands being similar to the pattern of colored areas of each like hue, said parts of each pattern of colored areas of like hue being in the form of separate spots disposed in a particular arrangement with which said raised lands may be aligned in one of three different lateral positions of said pressure-localizing planar member.

5. The exhibitor of claim 4 in which the spots of color are arranged on the varicolored backing surface in a plurality of parallel transverse contiguous rows each comprising successively repeated like groups of three spots of the three different hues and with the spots of each of the particular hues arranged in parallel normal rows spaced transversely apart by a pair of the normal rows respectively of the other two hues, the successive spots of any particular one of the three hues in the normal rows thereof being spaced in the normal direction by contiguous portions of spots of the remaining two hues.

6. The exhibitor of claim 1 in which is provided means to guide said pressure-localizing planar member in lateral shift with restriction of the lateral shift of the latter to the mentioned certain direction relative to the other planar elements in said stack, and means to shift said pressure-localizing planar member in said guide means between different relative lateral positions of said pressure-localizing planar member relative to the other planar elements of said stack.

7. The exhibitor of claim 6 in which said shiftable pressure-localizing planar member is located in said stack between said varicolored backing surface and said planar windowing means with said spaced raised lands on the former facing outwardly toward the latter, said lands and the areas of said pressure-localizing planar member carrying and aligned with said lands being of "see through" character.

8. The exhibitor of claim 6 in which said shiftable presure-localizing planar member is located in said stack on top and outward of said planar windowing means with its spaced raised lands facing inward toward the latter, said varicolored backing surface being overlaid by said planar windowing means with said lands and the areas of said pressure-localizing planar member carrying and aligned with said lands being of "see through" character, the portions of said pressure-localizing planar member intervening its lands being relatively highly flexible to limit inward windowing depression of such of its lands as are pressed inward by application of marking pressure immediately thereover.

9. The exhibitor of claim 8 in which the back of said pressure-localizing planar member which is facing outward is exposed for direct contact by a pressure-applying marking instrument and constitutes the display surface of the device.

10. Exhibitor of informative markings removably applied by pressure to a display surface thereof comprising
(a) a relatively extended stiff backing means having an outwardly facing and relatively fixed varicolored backing surface provided with a certain pattern of colored areas of a certain hue and a pair of additional similar patterns of colored areas of different hues both differing in hue from that of the first-mentioned pattern with the parts of any one of these three patterns being offset laterally in a transverse direction from the similar parts of either of the other two patterns at a uniform spacing in this lateral direction,
(b) a laterally shiftable and transparent pressure-localizing planar member overlying said varicolored backing surface and bearing on its outward face a fixed pattern of spaced raised transparent lands extending outwardly away from said varicolored backing surface with said lands arranged in a pattern similar to the pattern of any one of the hues for alternate and selective alignment with at least portions of the colored areas of only one of the hues in a particular one of three different relative lateral positions,
(c) guide means dictating reciprocative shift in the transverse direction of said pressure-localizing planar member relative to said varicolored backing surface between the three different lateral positions,
(d) means to reciprocate said pressure-localizing planar member in said guide means, and
(e) opaque planar means including windowing material overlying said lands and normally hiding them and the hues of the varicolored backing surface located therebelow, said opaque planar means being capable of being windowed locally to "see through" character immediately over said lands by pressure applied to said opaque planar means from the outer side thereof at points aligned with said lands.

11. Exhibitor of informative markings removably applied by pressure to a display surface thereof comprising in combination with (a) a relatively extended stiff backing means, a superimposed depressible flexible impression panel seemingly of limited opacity and certain hue loosely overlying and hiding said backing surface, and intervening planar windowing means to permit observation of the backing means through the impression panel at points of pressure depression of the latter which there windows the intervening means, of (b) a backing surface carried by said backing means facing toward said windowing means, said backing surface being provided with a certain pattern of colored spots of a certain hue and at least one additional similar pattern of colored spots of a different hue with the parts of the additional pattern offset laterally in a certain direction from the similar parts of the first-mentioned pattern at a uniform spacing in this lateral direction;

(c) said patterned varicolored backing surface, impression panel and intervening planar windowing means forming a stack of planar elements; and (d) pressure-localizing planar means positionable upon said stack and bearing on the underside thereof a fixed pattern of spaced pressure-localizing raised button lands facing downward toward said planar windowing means with said button lands arranged in a pattern for location immediately above at least portions of the colored spots of only one of the hues at one time and for location immediately above at least portions of the colored spots of only the other of the hues at another time, (e) all of the planar elements of said stack intervening said inverted pressure-localizing button lands and said windowing means being flexible for effective localized windowing pressure between said button lands and windowing means, and all planar elements and means in said stack intervening said varicolored backing surface and a point of observation outward of the top of said stack being of "see through" character.

References Cited by the Examiner

UNITED STATES PATENTS

| | | | |
|---|---|---|---|
| 1,568,548 | 1/1926 | Edelson | 35—66 |
| 2,596,890 | 5/1952 | Dechert | 35—66 |
| 3,135,059 | 6/1964 | Barish | 35—66 |

EUGENE R. CAPOZIO, *Primary Examiner.*